(12) United States Patent
Fink

(10) Patent No.: US 9,041,341 B2
(45) Date of Patent: *May 26, 2015

(54) MORE READILY AVAILABLE TRACTION BATTERY

(75) Inventor: Holger Fink, Stuttgart (DE)

(73) Assignee: Robert Bosch GmbH, Stuttgart, DE (US)

( * ) Notice: Subject to any disclaimer, the term of this patent is extended or adjusted under 35 U.S.C. 154(b) by 876 days.

This patent is subject to a terminal disclaimer.

(21) Appl. No.: 13/138,376

(22) PCT Filed: Dec. 14, 2009

(86) PCT No.: PCT/EP2009/067077
§ 371 (c)(1),
(2), (4) Date: Aug. 8, 2011

(87) PCT Pub. No.: WO2010/088998
PCT Pub. Date: Aug. 12, 2010

(65) Prior Publication Data
US 2012/0019209 A1   Jan. 26, 2012

(30) Foreign Application Priority Data
Feb. 6, 2009   (DE) .......................... 10 2009 000 674

(51) Int. Cl.
*H02J 7/00* (2006.01)
*H02J 7/14* (2006.01)
(Continued)

(52) U.S. Cl.
CPC ................ *H01M 10/44* (2013.01); *B60L 11/18* (2013.01); *B60L 11/1809* (2013.01); *B60L 11/1812* (2013.01); *B60L 11/1851* (2013.01); *H01M 10/425* (2013.01); *H01M 10/441* (2013.01); *H01M 10/46* (2013.01)

(58) Field of Classification Search
USPC ......... 320/110, 112, 116, 117, 118, 120, 121, 320/122, 104, 134, 136; 429/9, 96, 99, 122, 429/123, 149, 150, 152, 153, 156; 324/426
See application file for complete search history.

(56) References Cited

U.S. PATENT DOCUMENTS 4,303,877 A * 12/1981 Meinhold ..................... 320/122
5,773,962 A    6/1998 Nor
(Continued)

FOREIGN PATENT DOCUMENTS

CN         1599965 A      3/2005
JP         6-290815 A    10/1994
(Continued)

*Primary Examiner* — Edward Tso
*Assistant Examiner* — Alexis A Boateng
(74) *Attorney, Agent, or Firm* — Maginot, Moore & Beck LLP

(57) ABSTRACT

A battery includes a first terminal, a second terminal, a first battery module, a second battery module, and a third batter module. The first battery module and the second battery module includes a first pole, a second pole, a plurality of battery cells, a charge and disconnect device, a disconnect device, and a bridging device. The third battery module includes a first pole, a second pole, a plurality of battery cells, a first disconnect device, a second disconnect device, and a bridging device. The first and second poles of the first battery module are connected in series with the first terminal and the first pole of the third battery module. The first and second poles of the second battery module are connected in series with the second terminal and the second pole of the third batter module.

8 Claims, 5 Drawing Sheets

(51) Int. Cl.
*H01M 10/44* (2006.01)
*H01M 10/42* (2006.01)
*H01M 10/46* (2006.01)
*B60L 11/18* (2006.01)

(56) References Cited

U.S. PATENT DOCUMENTS

| | | | |
|---|---|---|---|
| 5,880,575 A * | 3/1999 | Itou et al. | 320/122 |
| 6,420,852 B1 * | 7/2002 | Sato | 320/134 |
| 6,593,669 B1 | 7/2003 | Lemaire et al. | |
| 7,126,342 B2 * | 10/2006 | Iwabuchi et al. | 324/426 |
| 7,132,833 B2 * | 11/2006 | Layden et al. | 324/429 |
| 7,489,106 B1 * | 2/2009 | Tikhonov | 320/116 |
| RE40,663 E | 3/2009 | Silverman | |
| 7,557,538 B2 * | 7/2009 | Yau et al. | 320/116 |
| 7,928,691 B2 * | 4/2011 | Studyvin et al. | 320/116 |
| 8,044,637 B2 * | 10/2011 | Thivierge et al. | 320/116 |
| 8,502,503 B2 * | 8/2013 | Densham | 320/122 |
| 8,564,245 B2 * | 10/2013 | Bosch et al. | 320/116 |
| 8,564,247 B2 * | 10/2013 | Hintz et al. | 320/119 |
| 2001/0035737 A1 * | 11/2001 | Nakanishi et al. | 320/122 |
| 2002/0177034 A1 * | 11/2002 | Kimura et al. | 429/61 |
| 2003/0071523 A1 | 4/2003 | Silverman | |
| 2003/0129457 A1 * | 7/2003 | Kawai et al. | 429/7 |
| 2006/0076923 A1 * | 4/2006 | Eaves | 320/112 |
| 2009/0073622 A1 * | 3/2009 | Hammond | 361/67 |
| 2009/0091293 A1 * | 4/2009 | Wang et al. | 320/118 |
| 2010/0182154 A1 * | 7/2010 | Kawai et al. | 340/636.1 |

FOREIGN PATENT DOCUMENTS

| | | |
|---|---|---|
| JP | 9-285027 A | 10/1997 |
| JP | 10-145978 A | 5/1998 |
| JP | 2000-106220 A | 4/2000 |
| JP | 2000182598 A | 6/2000 |
| JP | 2008-125158 A | 5/2008 |

* cited by examiner

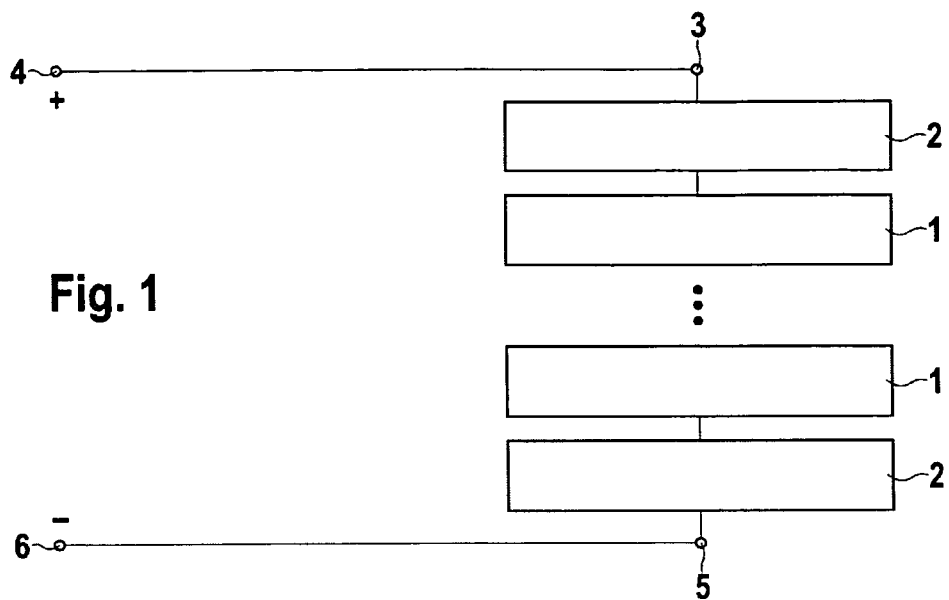
Fig. 1
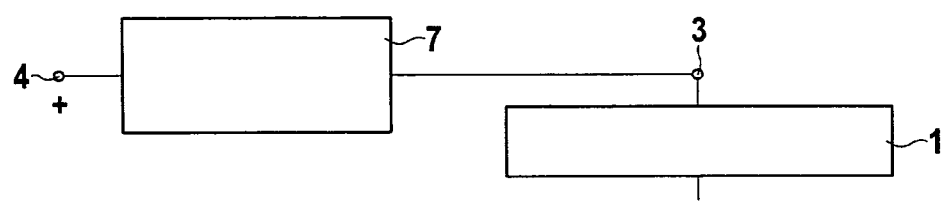
Fig. 2
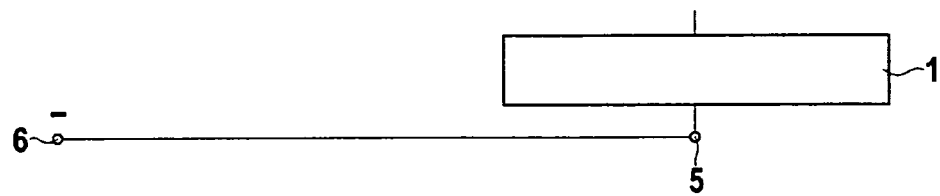

MORE READILY AVAILABLE TRACTION BATTERY

CROSS-REFRENCE TO RELATED APPLICATION

This application is a 35 USC 371 application PCT/EP2009/067077 field on Dec. 14, 2009

BACKGROUND OF THE INVENTION

1. Field of the Invention

The present invention relates to battery, in particular a traction battery.

2. Description of the Prior Art

It has become apparent that in the future, both in stationary applications (e.g. wind power stations) and in vehicles (e.g. in hybrid and electric vehicles), there will be increased use of new battery systems that will be subjected to very strict requirements with regard to reliability. The reason for these strict requirements is that a failure of the battery can result in a failure of the overall system (e.g. in an electric vehicle, a failure of the traction battery results in a so-called "stranded vehicle") or even in a safety-related problem (in wind power stations, for example, batteries are used for adjusting the rotor blades so as to protect the system from impermissible operating states).

In addition, the battery systems in stationary applications are frequently required to permit operation of the battery system—possibly with limited power—even during maintenance procedures, i.e. such a battery system must be constantly available without interruption.

The schematic wiring diagram of a battery system according to the current prior art is shown in FIG. 9. To achieve the required performance and energy data with the battery system, individual battery cells are connected in series and partially also in parallel. In addition to the battery cells, the battery system also has a so-called charging and disconnecting device CDD that is shown in FIG. 9 as being situated between the plus pole of the battery and the battery cells, without limiting general design freedom. The circuit breaker TS can be used to switch the battery on and off in monopolar fashion. As an optional functional unit, FIG. 9 shows another disconnecting device DD with which the battery—if necessary by means of another circuit breaker—can be switched off in bipolar fashion. In the charging and disconnecting device CDD, there is also a so-called charging switch LS with which a charging resistance can be connected between the battery cells and the externally connected systems in order to limit the equalizing currents when switching on the battery. In such a switching-on procedure, if the circuit breaker TS is open, then the charging switch LS in the charging and disconnecting device CDD is first closed and also—if provided—the circuit breaker TS in the optional disconnecting device DD on the minus pole of the battery system is closed. Then the input capacitances of the externally connected systems are charged via the charging resistance. If the voltage between the plus pole and minus pole of the battery system deviates only insignificantly from the sum voltage of the battery cells, then the charging procedure is terminated by the closing of the disconnecting switch in the charging and disconnecting device CDD. The battery system is then connected to the external systems in a low-impedance fashion and can be operated with its specified performance data. With the above-explained procedure, the equalizing currents that occur between the external systems and the battery system at the switching-on of the battery system can be limited to permissible values.

The reliability of the battery system is indicated by the failure rate. The failure rate describes the number of failures to be expected on average in a given period of time.

The failure rate of a battery with a series circuit of individual cells can be determined as follows:

$$\text{Failure rate}_{traction\ battery} = 1 - (1 - \text{failure rate}_{cell})^{number\ of\ cells} \quad (1)$$

The traction battery of an electric vehicle with a series circuit of 100 cells and a failure rate of 100 ppm/cell in the given period of time, for example, thus yields the following:

$$\text{Failure rate}_{traction\ battery} = 1 - (1 - 100\ \text{ppm})^{100} \quad (2)$$
$$= 9.95\%$$

With very low failure rates of the individual battery cells (e.g. failure rate$_{cell}$<1‰ in the given time period), the failure rate can be calculated approximately as follows (the power series expansion of the binomial series interrupted after the first term):

$$\text{Failure rate}_{traction\ battery} \approx \text{number of cells} * \text{failure rate}_{cell} \quad (3)$$

The failure rate of the traction battery in question is therefore about 100 times greater than the failure rate of an individual cell. The failure rate of the individual cells must therefore be smaller by a factor of approximately 100, given the required values for the failure rate of the battery system. For a battery system with 100 series connected cells, if a failure rate of 100 ppm in the given period of time is required, then the cells must have a failure rate of 1 ppm during this period of time. This is a requirement that is extremely hard to fulfill.

OBJECT AND SUMMARY OF THE INVENTION

In addition, the failure of one cell results in the failure of the entire battery system. During repair procedures when dead cells are being replaced, the battery system is not available. Therefore battery systems according to the current prior art cannot be used to produce battery systems that meet strict requirements with regard to availability.

The object of the invention is to increase the reliability and availability of battery systems in comparison to the current prior art. With the invention, the failure of one or more cells of a battery module should not result in the complete failure of the battery system. The battery system should then still be available with limited power. In addition, even during repair procedures that are required when dead cells are replaced, it should be possible to continue operating the battery system with limited power, thus increasing the availability of the battery system.

The battery according to the invention has the advantage over the prior art that the battery system is internally modified relative to the current prior art by adding functional units. These additional functional units include
- disconnecting devices and/or
- charging and disconnecting devices and/or
- bridging devices that will be described in greater detail below. These functional units have been used according to the invention to construct battery modules that can be bridged over upon failure of one or more cells. If the overall system is composed of a plurality of such battery modules, then—depending on the requirements and the embodiment of the battery system—one or more of the battery modules can be bridged over upon failure of one or more cells in the corresponding module. The battery system does then have a limited power at its terminals as compared to regular operation, but with a suitable design of the battery system, it is possible to prevent the system from failing or shifting into a safety-critical state. In addition, the failure of the cells or of the module is detected and repair procedures can be initiated. This increases the reliability of the battery system. The battery system is designed so that the repair procedures can be carried out without interrupting operation. This increases the availability of the battery system.

In a particularly preferred embodiment, the battery according to the invention includes a charging device that is connected between the first terminal of the series circuit of battery modules and the first battery pole and/or is connected between the second terminal of the series circuit of battery modules and the second battery pole, with the battery including only first battery modules. In this case, in the event of a failure of any of the battery modules, a limiting of the equalizing currents in the traction electrical system is assured; only simply designed first battery modules are provided.

In an alternative embodiment, the battery according to the invention preferably includes only second battery modules. In this case, even if any of the battery modules fails, a limiting of the equalizing currents in the traction electrical system takes place; it is not necessary to provide a separate charging device since the second battery modules are each equipped with one. This permits a simpler assembly of the battery, which is composed exclusively of identical modules.

In an alternative embodiment, the battery according to the invention preferably includes n battery modules: 2 second battery modules and n−2 first battery modules. In this case, even if one of the second battery modules fails, a limiting of the equalizing currents in the traction electrical system is assured since in this case, the charging device of the second of the second battery modules is still present and can be used.

In the battery according to the invention, the bridging device is preferably also embodied or alternatively embodied so that it can produce a short-circuit of the first battery module pole and second battery module pole only if there is an interruption of the connection between the series circuit and/or parallel circuit of battery cells and the first battery module pole and/or an interruption of the connection between the series circuit and/or parallel circuit of battery cells and the second battery module pole.

BRIEF DESCRIPTION OF THE DRAWING

Exemplary embodiments of the invention will be described in detail below with reference to the accompanying drawings.

FIG. 1 shows a schematic wiring diagram of a battery, preferably a traction battery, according to a first preferred embodiment of the invention, FIG. 2 shows a schematic wiring diagram of a battery, preferably a traction battery, according to a second preferred embodiment of the invention.

DESCRIPTION OF THE PREFERRED EMBODIMENTS

First, definitions will be given for the terms reliability and availability as they are used here (definitions according to Laubner/Göhner: Prozessautomatisierung 1 [process automation], $3^{rd}$ edition, Springer-Verlag):

Reliability is the capacity of a system to function properly for a predetermined time (also referred to as dependability).

Availability is the probability that a reparable system will be found in a functional state at a predetermined time.

A high degree of availability can thus be achieved through
High reliability of the system
Brief repair times (if the system is not operational during repair times) or—if possible—through repairs carried out without interrupting operation.

The invention increases the availability of battery systems compared to the prior art because the failure of an individual battery cell does not immediately result in the failure of the battery system, i.e. in that the reliability of the system is increased and in addition, it is possible to operate the system even while repair procedures are being carried out. As opposed to the current prior art, with the present invention, in battery modules that have a series circuit of battery cells, the battery system is preferably modified internally by adding functional units that will be first described below:

Disconnecting devices $1d$, a schematic depiction of which is shown in FIG. $6a$ and one embodiment of which is shown in FIG. $6b$:

A disconnecting device $1d$ is used to disconnect the battery cells $1c$ of a first battery module 1 in monopolar fashion from one of the two poles $1a$, $1b$ of the battery module 1 and to connect the battery cells $1c$ in a low-impedance fashion to the corresponding pole $1a$, $1b$.

For a bipolar disconnection of the battery cells $1c$ from the two poles $1a$, $1b$ of the battery module 1, it is also possible to use two disconnecting devices $1d$ in a battery module 1 (it is practical to respectively provide one directly on the plus pole of the battery module and one directly on the minus pole).

Figure 6A:
FIG. 6 shows a schematic wiring diagram of a disconnecting device according to a preferred embodiment of the invention.
Figure 6B:
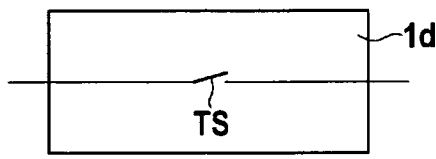

The basic principle of the present invention is independent of the specific embodiment of the circuit breaker TS in the disconnecting device $1d$; it can be embodied among other things in the form of an electromechanical switch (relay or contactor), an electronic switch (semiconductor switch), or a combination of an electromechanical and electronic switch:

Charging and disconnecting devices $2d$, a schematic depiction of which is shown in FIG. $7a$ and one embodiment of which is shown in FIG. $7b$:

A charging and disconnecting device $2d$ constitutes the functional expansion of a disconnecting device $2d1$, which functions in the same way as the disconnecting device 1d described above in connection with FIG. 6 and has the same purpose, through addition of a charging device 2d2, which limits the charging and equalizing currents that occur when the battery system or a battery module is switched on. These currents are caused by the input capacitances of the external systems, which before the battery is switched on, are generally not at the same voltage as the sum voltage of the battery system. In the simplest case, the charging and equalizing currents are limited by means of a resistance LW, which is connected in series with the charging switch LS. Through suitable selection of the resistance value, the equalizing currents are limited to permissible values for the battery system and for the external systems. If the voltage at the poles of the battery system or the voltage at the poles of a battery module 2 equipped with a charging and disconnecting device 2d is approximately the same voltage as the sum voltage of the corresponding battery cells 2c (i.e. the voltage drop at the charging resistance is low), then the circuit breaker TS in the charging and disconnecting device 2d can be closed. The switching-on procedure of a battery system or a battery module therefore occurs as follows: If the circuit breaker TS is open, then the charging switch LS of the charging and disconnecting module 2d is first closed. The external capacitances are then charged or recharged until the voltage at the poles of the battery system or battery module approximately corresponds to the sum voltage of the associated battery cells. Then, the circuit breaker TS is closed and the charging procedure is terminated. The battery cells are then connected in a low-impedance fashion to the poles of the battery system or battery module:

The circuit breaker TS and the charging switch LS of the charging and disconnecting module 2d can have the same concrete embodiment as the circuit breaker TS of the disconnecting device 1d.

Figure 8A:
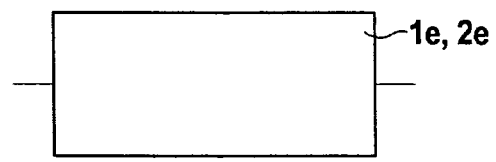
FIG. 8 shows a schematic wiring diagram of a bridging device according to a preferred embodiment of the invention.
Figure 8B:
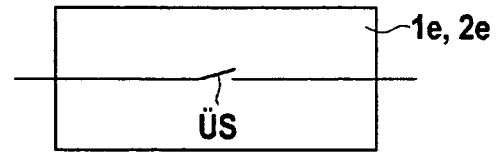
Figure 9:
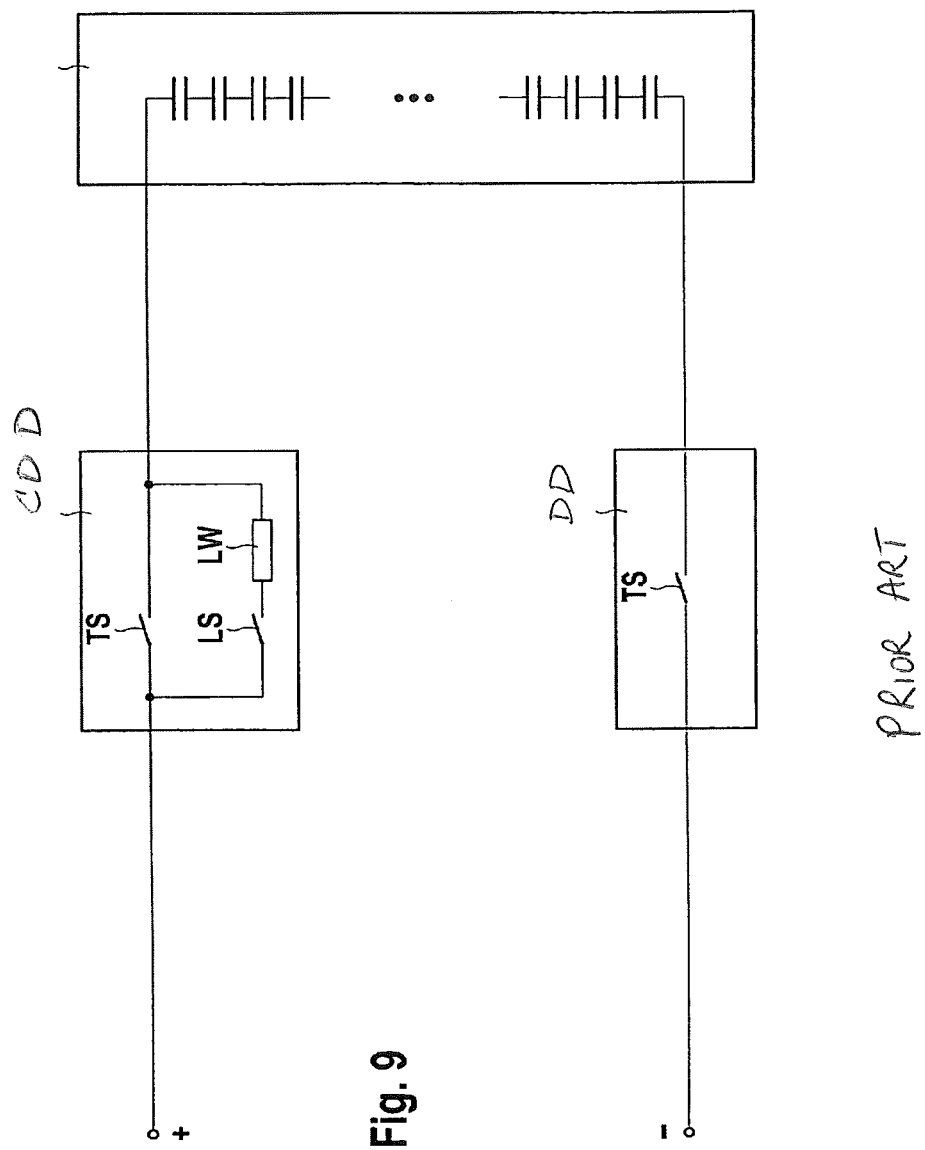
FIG. 9 shows a schematic wiring diagram of a traction battery according to the prior art.

Bridging devices 1e; 2e, a schematic depiction of which is shown in FIG. 8a and one embodiment of which is shown in FIG. 8b:

A bridging device 1e; 2e is used to bridge a battery module 1, 2 in low-impedance fashion, i.e. to connect the plus and minus poles of the battery module 1, 2 in low-impedance fashion, upon failure of one or more battery cells 1c, 2c in the battery module 1, 2.

The basic principle of the present invention is independent of the specific embodiment of the bypass switch US in the bridging device, which—as described in connection with the circuit breaker—can be embodied among other things in the form of an electromechanical switch (relay or contactor), an electronic switch (semiconductor switch), or a combination of an electromechanical and electronic switch.

Figure 4:
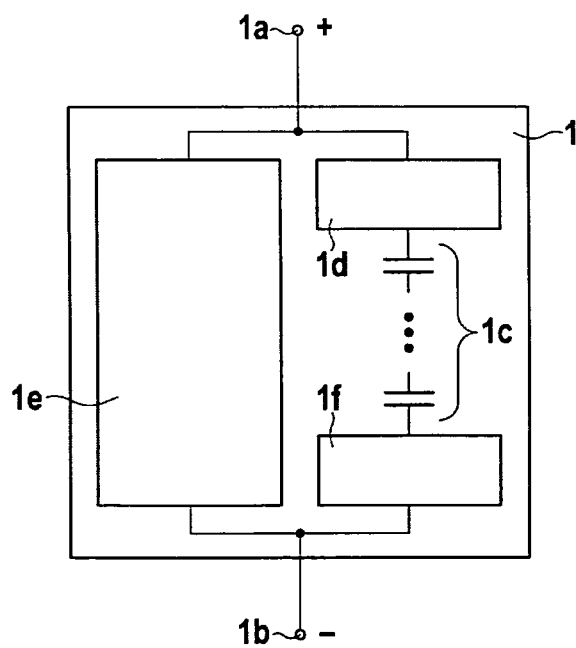
FIG. 4 shows a schematic wiring diagram of a first battery module according to a preferred embodiment of the invention.

Battery modules can be constructed based on the above-described functional units and can then be connected to battery systems. Depending on the requirements placed on the battery system, it can be practical to use the following topologies for the battery modules:

First battery module (topology 1) with two disconnecting devices and bridging device, as shown in FIG. 4.

In this topology, two disconnecting devices 1d, 1f are used to disconnect the battery cells 1c in bipolar fashion, i.e. from both poles 1a, 1b of the battery module 1 and to connect the battery cells 1c to the two poles 1a, 1b in a low-impedance fashion. The bridging device 1e, which is arranged in parallel with the disconnecting devices 1d, 1f and the battery cells 1c, is used to bridge over the first battery module 1 in a low-impedance fashion upon failure of one or more cells 1c of the first battery module 1. The bypass switch in the bridging device 1e is preferably closed only if at least one of the circuit breakers of the two disconnecting devices 1d, 1f is open. Providing two disconnecting devices 1d, 1f enables repair of a bridged-over battery module (e.g. replacement of dead cells) without the presence of voltage in the cells. This increases the availability of the system since it is possible to continue operating the battery system during the repair procedures.

The disconnecting devices 1d, 1f and the bridging device 1e are triggered via signal lines to control and diagnose the battery module functional units, which are not shown.

Figure 5:
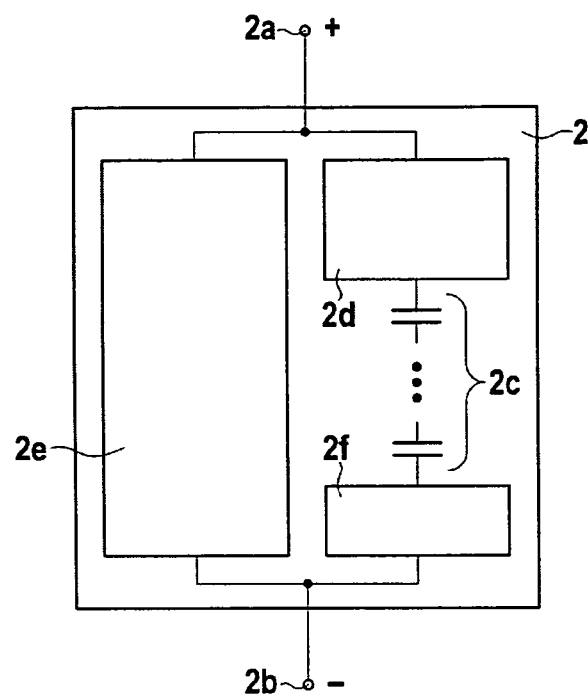
FIG. 5 shows a schematic wiring diagram of a second battery module according to a preferred embodiment of the invention.

Second battery module (topology 2) with a charging device, two disconnecting devices, and a bridging device, as shown in FIG. 5.

Figure 7A:
FIG. 7 shows a schematic wiring diagram of a charging and disconnecting device according to a preferred embodiment of the invention.
Figure 7B:
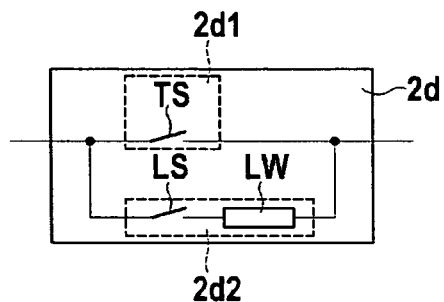

By contrast with topology 1, in this topology, a charging device is additionally provided in the second battery module 2, i.e. a charging and disconnecting device 2d shown in FIG. 7 is used in lieu of the disconnecting device 1d to limit the charging and equalizing currents when the battery system is switched on (other properties equivalent to topology 1).

The charging and disconnecting device 2d, the disconnecting device 2f, and the bridging device 2e are triggered via signal lines to control and diagnose the battery module functional units, which are not shown.

The above-described battery modules are used according to the invention to construct modular battery systems that have an increased reliability by comparison with the current prior art. Three battery systems with different topologies (labeled topology A, B, and C) should be taken into consideration as examples for the interconnection of the above-described battery modules.

Battery system with topology A according to a second preferred embodiment of the invention, as depicted in FIG. 2, with
  a separate charging and disconnecting device 7,
  several first battery modules 1 (topology 1) connected in series.
  Advantages:
    Uniform battery modules are used.
    All told, only one charging device is used, which is active when the battery system is switched on.

Figure 3:
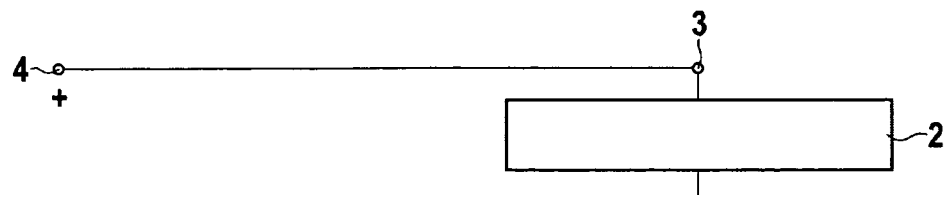
FIG. 3 shows a schematic wiring diagram of a battery, preferably a traction battery, according to a third preferred embodiment of the invention.
Figure 3:
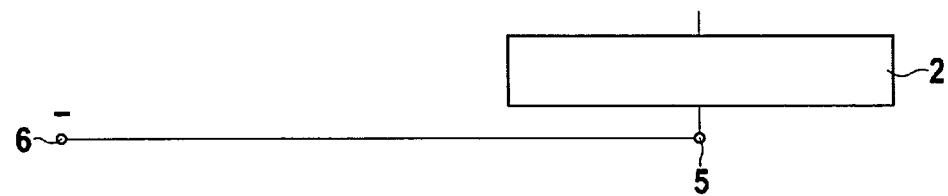

Battery system with topology B according to a third preferred embodiment of the invention, as depicted in FIG. 3, with
  a plurality of second battery modules 2 (topology 2) connected in series.
  Advantages:
    Uniform battery modules are used.
    Lower internal resistance by comparison with topology A since one fewer disconnecting device is connected in series.

Battery system with topology C according to a first preferred embodiment of the invention, as depicted in FIG. 1, with
  two second battery modules 2 (topology 2) connected in series,
  one or more first battery modules 1 (topology 1) connected in series.
  Advantages:
    Lower internal resistance by comparison with topology A since one fewer disconnecting device is connected in series.

Lower additional cost, by comparison with topology B, for the charging devices, which are only provided in two battery modules (cost and space savings). Two battery modules with charging devices are required so that in the event of a malfunction in one of these two modules, after a bridging procedure, there is still one charging device for connecting the battery to the external systems.

The following applies to all of the above-described battery systems:

Upon failure of one or more cells in a battery module, after the disconnecting switch in the disconnecting device(s) is/are opened, the affected module can be short-circuited in a low-impedance fashion by closing the bypass switch.

Depending on the number of battery modules of the battery system and the number of bridged-over battery modules, there is then still a battery system available, which has the following data as compared to the regular operation with all battery modules.

| Battery system with n modules | Bridging of 1 module | Bridging of 2 modules | Bridging of n − 1 modules |
|---|---|---|---|
| Reduction of power P to | $\frac{n-1}{n} \cdot P_{Regular}$ | $\frac{n-2}{n} \cdot P_{Regular}$ | $\frac{1}{n} \cdot P_{Regular}$ |
| Reduction of Energy E to | $\frac{n-1}{n} \cdot E_{Regular}$ | $\frac{n-2}{n} \cdot E_{Regular}$ | $\frac{1}{n} \cdot E_{Regular}$ |

In a battery system with 5 battery modules, after a battery module is bridged over, a battery system is available that still has 80% of the power and 80% of the energy of the complete battery system.

In addition to the above written disclosure, the disclosure in the figures is also expressly included herein by reference.

The foregoing relates to the preferred exemplary embodiments of the invention, it being understood that other variants and embodiments thereof are possible within the spirit and scope of the invention, the latter being by the appended claims.

The invention claimed is:

1. A battery comprising:
   a first terminal;
   a second terminal;
   a first battery module and a second battery module each comprising:
      a first pole;
      a second pole;
      a plurality of battery cells;
      a charge and disconnect device connected between the first pole and the plurality of battery cells, the charge and disconnect device being configured to:
         connect the plurality of battery cells to the first pole and limit a flow of a charging current or an equalizing current through the plurality of battery cells; and
         disconnect the plurality of battery cells from the first pole;
      a disconnect device connected between the plurality of battery cells and the second pole, the disconnect device configured to:
         connect the plurality of battery cells from the second pole; and
         disconnect the plurality of battery cells from the second pole; and
      a bridging device configured to connect the first pole to the second pole in response to at least one of the charge and disconnect device disconnecting the plurality of battery cells from the first pole and the disconnect device disconnecting the plurality of battery cells from the second pole;
   a third battery module comprising:
      a first pole;
      a second pole;
      a plurality of battery cells;
      a first disconnect device connected between the plurality of battery cells and the first pole, the first disconnect device configured to:
         connect the plurality of battery cells to the first pole; and
         disconnect the plurality of battery cells from the first pole;
      a second disconnect device connected between the plurality of battery cells and the second pole, the second disconnect device configured to:
         connect the plurality of battery cells to the second pole; and
         disconnect the plurality of battery cells from the second pole; and
      a bridging device configured to connect the first pole to the second pole in response to at least one of the first disconnect device disconnecting the plurality of battery cells from the first pole and the second disconnect device disconnecting the plurality of battery cells from the second pole;
   the first and second poles of the first battery module being connected in series with the first terminal and the first pole of the third battery module; and
   the first and second poles of the second battery module being connected in series with the second terminal and the second pole of the third battery module.

2. The battery according to claim 1, wherein the battery further comprises a charging device, which is connected between at least one of:
   (i) the first terminal and the first battery module, and
   (ii) the second terminal and the second battery module.

3. The battery according to claim 1, wherein the battery further comprises a fourth battery module, the battery module comprising:
   a first pole;
   a second pole;
   a plurality of battery cells;
   a charge and disconnect device connected between the first pole and the plurality of battery cells, the charge and disconnected device being configured to:
      connect the plurality of battery cells to the first pole and limit a flow of a charging current or an equalizing current through the plurality of battery cells; and
      disconnect the plurality of battery cells from the first pole;
   a disconnect device connected between the plurality of battery cells and the second pole, the disconnect device configured to:
      connect the plurality of battery cells from the second pole; and
      disconnect the plurality of battery cells from the second pole; and
   a bridging device configured to connect the first pole to the second pole in response to at least one of the charging and disconnect device disconnecting the plurality of battery cells from the first pole and the disconnect device disconnecting the plurality of battery cells from the second pole.

4. The battery according to claim 1,
a fourth battery module, the fourth battery module comprising:
a first disconnect device connected between the plurality of battery cells and the first pole, the first disconnect device configured to:
connect the plurality of battery cells to the first pole; and
disconnect the plurality of battery cells from the first pole;
a second disconnect device connected between the plurality of battery cells and the second pole, the second disconnect device configured to:
connect the plurality of battery cells to the second pole; and
disconnect the plurality of battery cells from the second pole; and
a bridging device configured to connect the first pole to the second pole in response to at least one of the first disconnect device disconnecting the plurality of battery cells from the first pole and the second disconnect device disconnecting the plurality of battery cells from the second pole.

5. The battery according to claim 1, wherein the charge and disconnect device is further configured to:
charge at least one external capacitance such that a voltage between the first pole and second pole of the second battery module corresponds to a sum voltage of the battery cells.

6. The battery according to claim 5, wherein the charge and disconnect device further comprises:
a circuit breaker and a charging switch.

7. The battery according to claim 6, wherein the charge and disconnect device charges external capacitances by closing a charging switch in response to opening of a circuit breaker.

8. The battery according to claim 7, wherein the charge and disconnect device terminates charging the external capacitances in response to closing of the circuit breaker.

* * * * *